United States Patent
Nguyen et al.

(10) Patent No.: US 7,973,111 B2
(45) Date of Patent: Jul. 5, 2011

(54) MECHANICALLY OPERATED KILL AGENT INJECTION SAFETY SYSTEM AND METHOD TO STOP A RUNAWAY CHEMICAL REACTION

(75) Inventors: Thanh Tri Nguyen, Sugar Land, TX (US); Tom Eugene Cushman, Humble, TX (US); John Stevenson, Crosby, TX (US); Alan Bitzer, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 1604 days.

(21) Appl. No.: 10/857,188

(22) Filed: May 28, 2004

(65) Prior Publication Data

US 2004/0253151 A1    Dec. 16, 2004

Related U.S. Application Data

(60) Provisional application No. 60/475,452, filed on Jun. 2, 2003.

(51) Int. Cl.
*C08F 2/38* (2006.01)
*B01J 19/00* (2006.01)
*B01J 8/18* (2006.01)

(52) U.S. Cl. ............... 526/82; 526/83; 526/84; 526/85; 422/131; 422/139

(58) Field of Classification Search .................. 526/82, 526/83, 84, 85; 422/139, 131
See application file for complete search history.

(56) References Cited

U.S. PATENT DOCUMENTS

| 4,445,531 A | 5/1984 | Powell ........................ 137/489 |
| 5,432,242 A | 7/1995 | Baron |
| 6,365,681 B1 * | 4/2002 | Hartley et al. ................. 526/61 |

* cited by examiner

*Primary Examiner* — William K Cheung
(74) *Attorney, Agent, or Firm* — Bradley A. Misley

(57) ABSTRACT

Disclosed is a method to safely terminate a runaway reaction within a reaction vessel, comprising: sensing an increase in pressure in the reaction vessel, opening a barrier blocking a flow path into the reactor, wherein the barrier opening is achieved via a mechanical response to the sensed increase in pressure, and injecting a kill agent into the reaction vessel via the opened flow path, thereby terminating the reaction. Also disclosed is a system for performing the method. The system functions without an external electrical source and is therefore compliant with ASME standards.

12 Claims, 4 Drawing Sheets

MECHANICALLY OPERATED KILL AGENT INJECTION SAFETY SYSTEM AND METHOD TO STOP A RUNAWAY CHEMICAL REACTION

CROSS-REFERENCE TO RELATED APPLICATIONS

This application claims priority from the U.S. Provisional Patent Application filed on Jun. 2, 2003 and having the Ser. No. 60/475,452.

FIELD OF THE INVENTION

This invention generally relates to injection kill systems and/or safety relief systems to protect tanks under positive pressure relative to the atmosphere. More specifically, the invention relates to a mechanically operated safety injection kill system to prevent extreme over pressurization of a reaction vessel due to a runaway chemical reaction.

BACKGROUND OF THE INVENTION

In the field of safety system design for vessels under positive pressure relative to the atmosphere, devices to relieve excess pressure are desirable for safety purposes. Excessive pressurization may be caused by an emergency such as a loss of power, a loss of reactor cooling water, and/or a fire surrounding a reaction vessel and heating the fluids therein. Likewise, heat may be generated for example by a runaway chemical reaction within a vessel. In the case of a catalyzed chemical reaction, catalyst activity levels have increased over the years through research and development, and the risk of such runaway reactions and safety concerns related thereto has increased.

Safety relief systems are typically provided for an emergency vent in a pressure vessel and are sized according to expected over pressurizations due to an emergency to quickly and safely relieve excessive system pressure without rupturing the pressurized vessel. The American Society of Mechanical Engineers (ASME) states that safety and protection relief systems cannot be electrically driven, so that they will operate in the event of a power failure. Examples of such ASME safety relief systems include mechanical relief valves, rupture disks, etc. However, activation of traditional relief systems may have an adverse environmental impact and/or may require significant maintenance work and loss of production time to bring the vessel back to service. Therefore, a common practice in the industry is to install an Engineered Control System (ECS) to prevent the pressure to reach the relief set point. Such practices as early relief, depressurization, dumping, etc are typically employed. For a reactor vessel, injection of a kill agent at the onset of a runaway to stop the reaction is normally used. However, the reliability of a reactor "kill" system depends upon the availability of external energy sources. A typical reactor kill system requires electricity to power a control system including an instrument signal, programmed logic interlock, electrical solenoids, etc. It also requires the availability of pneumatic power (i.e. instrument air) to drive the valves' actuators. In certain emergency scenario, i.e. power failure, the external energy sources may not be available and rendered the reactor kill system useless. Thus, a need exists for a mechanically driven safety injection kill system for protecting against vessel over pressurizations to replace or supplement existing traditional systems.

BRIEF DESCRIPTION OF THE DRAWINGS

The invention, together with further advantages thereof, may best be understood by reference to the following description taken in conjunction with the accompanying drawings in which.

Figure 1:
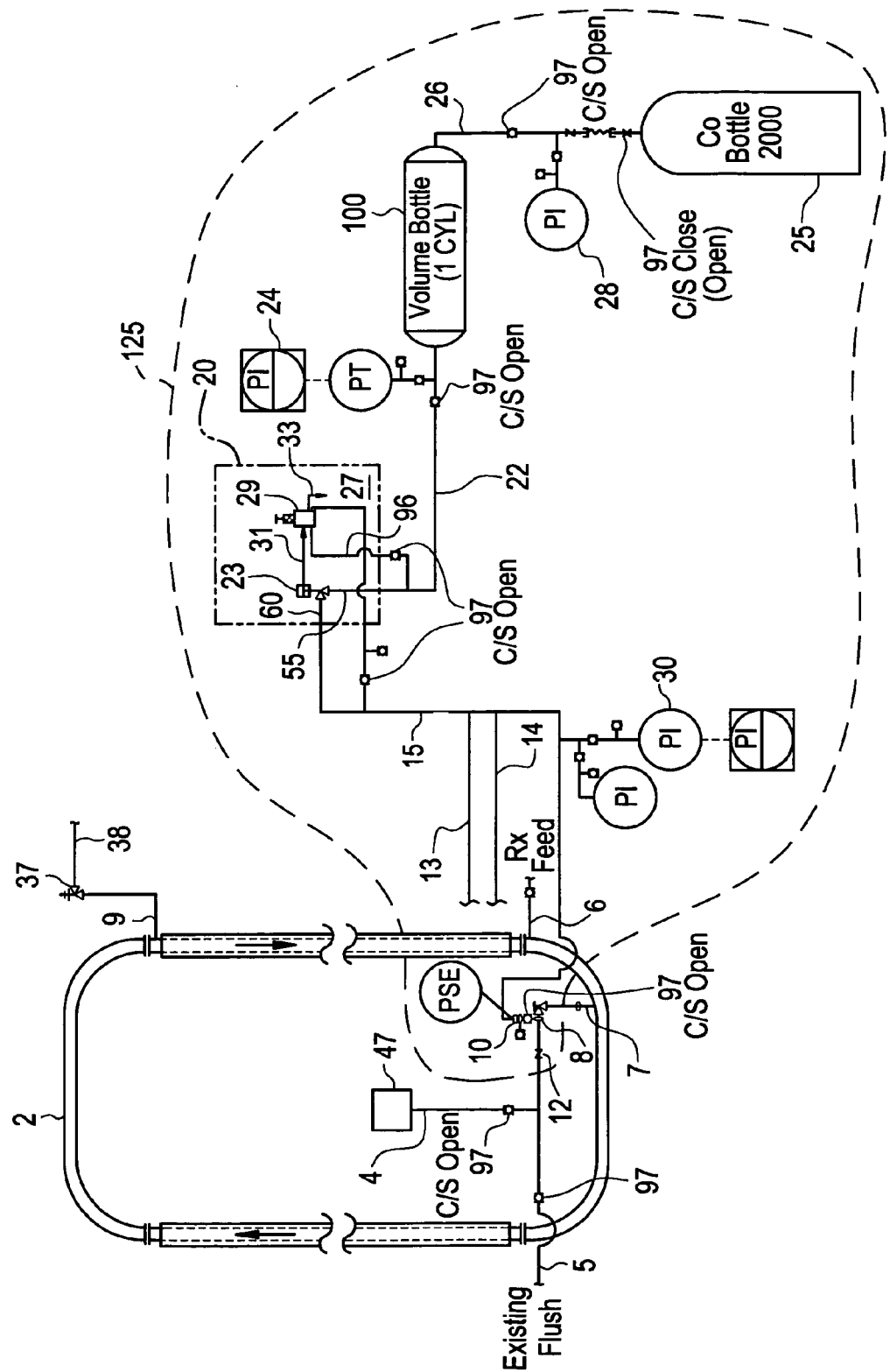
FIG. 1 is a process flow diagram of an embodiment of the present invention, wherein a pilot operated relief valve will open to inject carbon monoxide into a bulk loop polypropylene reactor to kill the reaction.
Figure 3A:
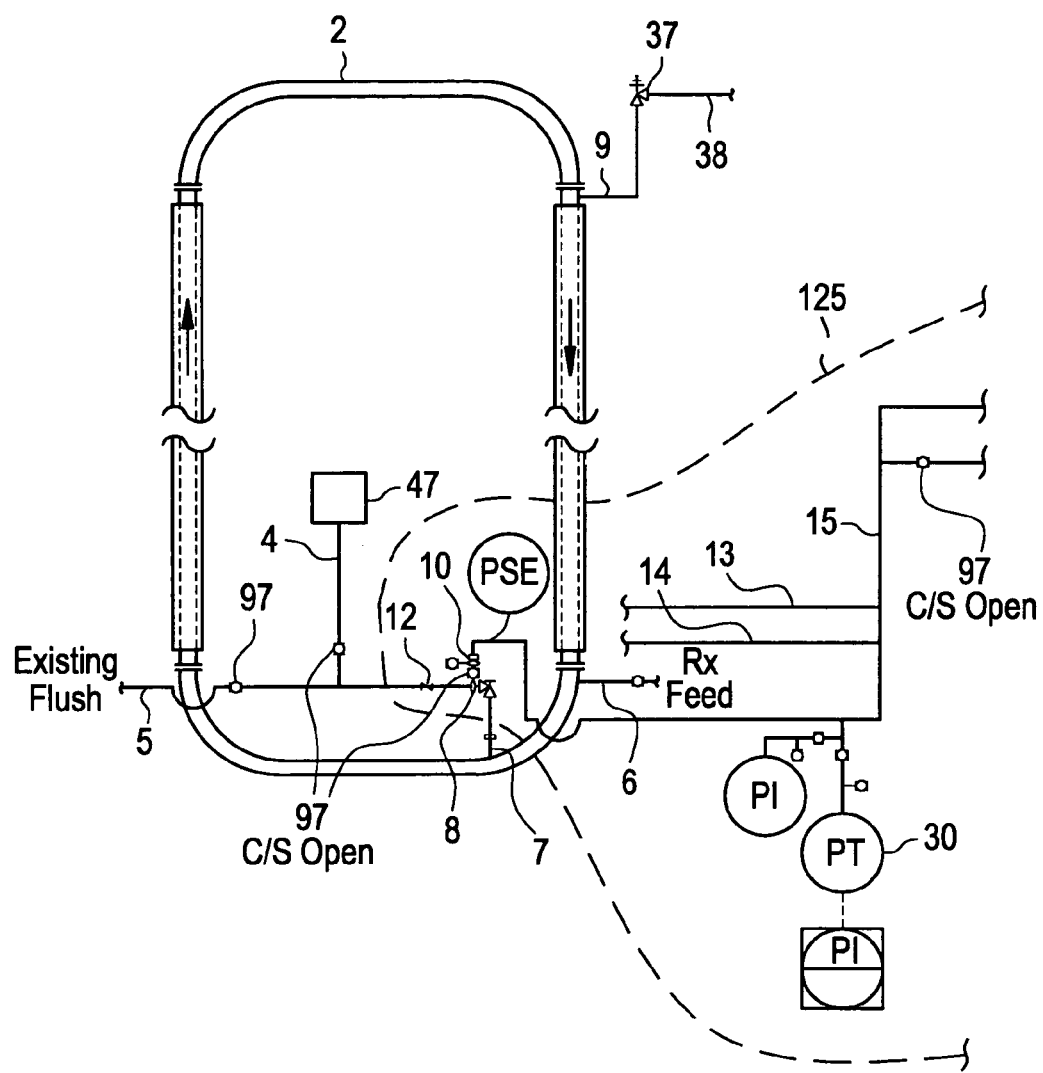
FIGS. 3a and 3b are close up views of portions of the process flow diagram shown in FIG. 1.
Figure 3B:
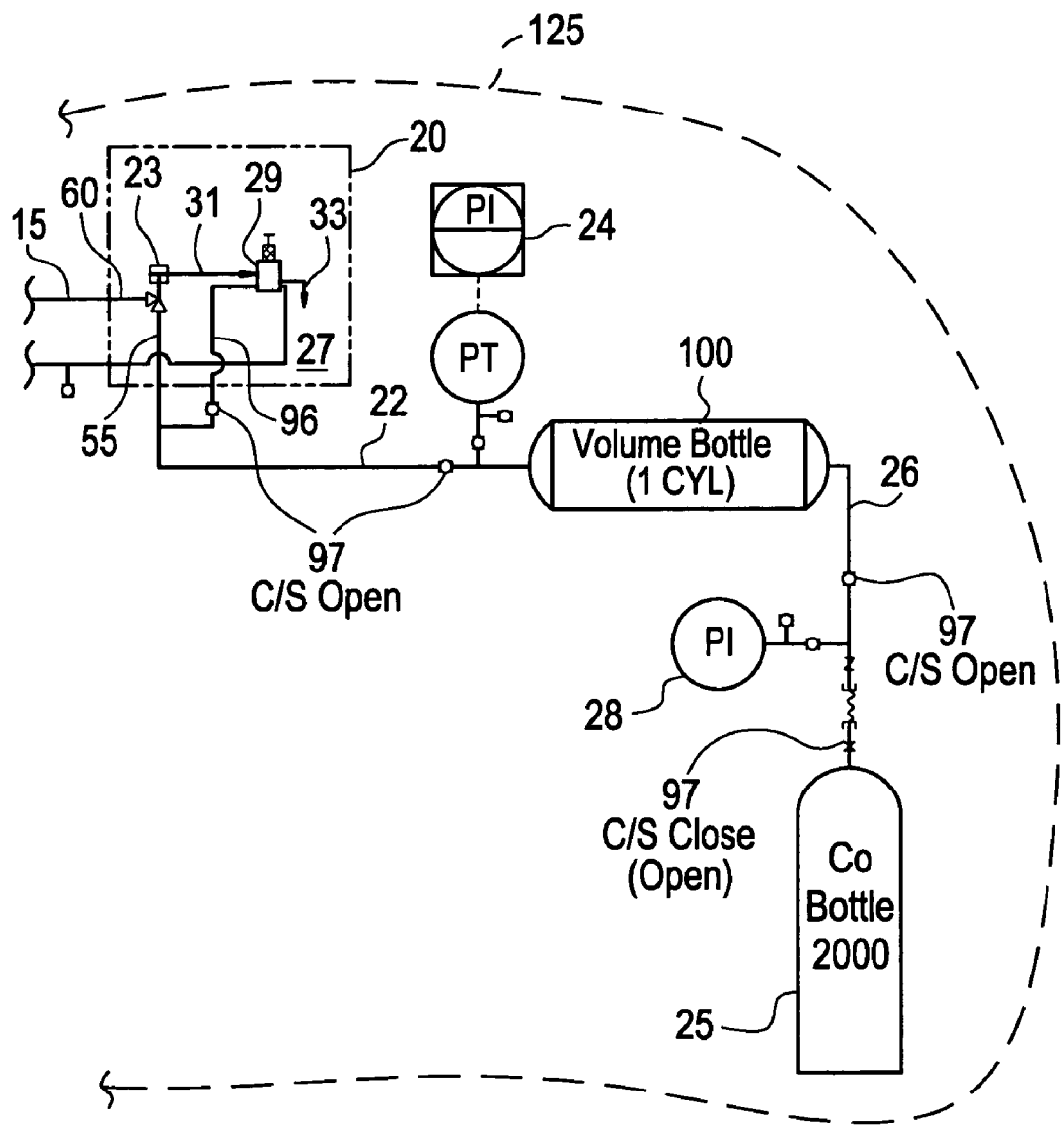

Note that throughout the following description, FIGS. 3a and 3b, though not directly referred to, can optionally be used to illustrate any reference to FIG. 1.

DETAILED DESCRIPTION OF THE PREFERRED EMBODIMENTS

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Specifically, the emergency safety injection kill process and system of the present invention may be used for any pressure vessel or reactor wherein a chemical reaction occurs with a potential for over pressurizing the reaction vessel in the event of an emergency situation, such as a runaway reaction. In an embodiment of the present invention, the emergency safety injection kill process and system of the present invention is integrated with a bulk loop polypropylene reactor, and the remainder of the detailed description will focus on this embodiment with the understanding that the present invention may have broader applications such as slurry reactors, slurry loop reactors, stirred tank reactors, gas phase reactors, liquid phase reactors, and combinations thereof including with or without bulk loop reactors. Furthermore, the remainder of the detailed description may focus on catalyzed reactions and kill agents suitable therefore, with the understanding that the process and system may also be used with uncatalyzed reactions with the selection of an appropriate kill agent.

Disclosed herein is an emergency safety injection kill system and method for use of same. The system has a pressure activated mechanical barrier including a non reclosing pressure relief device and a valve structure to selectively inject a kill agent into a reaction vessel in the event of a runaway chemical reaction. The emergency safety injection kill system of this disclosure can utilize ASME approved devices, such as a pilot operated safety relief valve and a rupture disk, that require no electrical instruments or automated controls to initiate a reaction kill. Such a system has improved reliability for relieving capabilities in the event of a total loss of power during a runaway reaction. To ensure that the emergency safety injection kill system does not undesirably kill the reaction in a non-emergency situation, the pressure activated mechanical barrier isolates the reactor from the kill agent. The mechanical barrier prevents the injection of the kill agent into the reactor as long as the reactor pressure stays below the set pressure of the devices used in the mechanical barrier. If the pressure of the reactor exceeds the set pressures of the mechanical barrier, the mechanical barrier will open and the kill agent will be injected into the reactor. The emergency safety kill system may be used as a stand alone system or may be used in conjunction with one or more additional safety systems as described herein. Additional safety relief valves would normally be used to relieve the vessel in the event of vessel exposure to fire and normally require a much smaller relief valve.

Referring to FIG. 1, a reaction vessel 2 is coupled to an emergency safety injection kill system 125 for safely killing a chemical reaction within the reaction vessel in the event of over pressurization due to a runaway reaction. The emergency safety injection kill system 125 further comprises a pressurized supply of kill agent, for example container 25; a means for providing the kill agent to a chemical reaction in the reaction vessel 2, for example lines 15, 22, and 26; a means for mechanically isolating the reaction vessel from the kill agent, for example a rupture disk 10 and a modified pilot operated relief valve 20; and a means for opening the means for mechanically isolating the reaction vessel from the kill agent, for example a pressure sensory line 27 and a pilot valve 29 to mechanically operate a main relief valve 23. All lines and devices of the emergency safety kill injection system are desirably sized accordingly to accommodate the maximum system pressure, for example the pressure exerted by the pressurized container of kill agent 25.

Reaction vessel 2 is coupled to the emergency safety injection kill system 125 by line 15, which ultimately terminates at an injection port located in reaction vessel 2. As used herein, the terms line and stream include any conventional physical means for conveying a fluid such as a piping, tubing, conduit, and the like. Any suitable type of injection port, either previously existing or newly added, may be used to couple the emergency safety injection kill system 125 to reaction vessel 2 such that reaction kill agent may be transferred from the injection kill system to the reaction vessel. A plurality of injection ports may be used, for example spaced about equally around the lower elevation of the reactor to ensure a quick and evenly dispersed injection of kill agent into reaction vessel 2.

In an embodiment of the present invention, the reaction vessel 2 may also be configured such that one or more injection ports 7 located in lower portions of each leg of the reactor connect to a second kill system 47 via line 4. The second kill system refers to a system used in the normal, non-emergency operation of the reaction vessel (sometimes referred to as an engineered control system), for example to kill a polymerization reaction upon reaching a desired level of polymerization or during a shut down for cleaning or maintenance of the vessel. The second kill system typically uses electrical components, such as controller, solenoid, and pumps, that may become inoperable should a power failure occur. An example of a second kill system for a polypropylene bulk loop reactor is supply and means for injection of alcohol, e.g., methanol, isopropanol; water; water and alcohol; carbon monoxide, pure or mixed with diluent gases such as nitrogen; a N,N-Bis (2-hydroxyethyl) alkylamine, such as ATMER 163 available from ICI Americas Inc.; a polymeric nitrogen and sulfur compound known as STADIS 425 available from Dupont; and the like. Mixtures of these materials can also be used. Any compound or material that is known to those of ordinary skill in the art of killing a reaction to be useful can be used with the present invention.

In the embodiment of FIG. 1, the emergency safety injection kill system 125 is coupled to the reaction vessel 2 via injection port 7, which may be part of an existing, second kill system 47 or alternatively may be a separate, dedicated injection port. The injection port 7 may be configured to receive a clean fluid, such as propylene, from flush line 5 for purging and flushing any solid material from the injection point to prevent plugging thereof. Flush line 5 contains a tee 8, and the emergency safety injection kill system 125 is coupled to tee 8 via line 15. Additionally, a check valve 12 is inserted in flush line 5 to prevent back flow. Other close/open valves 97 as shown in FIGS. 1, 2, 3a and 3b are located at various points throughout the system disclosed and can be used to isolate streams as needed for maintaining the system.

Reaction vessel 2 may be any pressure vessel or reactor with any reaction occurring within that has a potential for over pressurizing in the event of a runaway reaction. In an embodiment of the present invention, reaction vessel 2 is a polymerization reactor; more specifically, a poly alpha-olefin reactor; more specifically, a polypropylene reactor; and more specifically, a bulk loop polypropylene reactor, for example a bulk loop reactor having a plurality of loops, with each loop having a plurality of segments or "legs" connected in series. A polypropylene reactor system typically comprises a catalyst such as a Zeigler-Natta and/or metallocene catalyst, but the reactor can also be used for free radical polymerizations. Reaction vessel 2 is configured for receiving reactants, for example via inlet feed stream 6. Reaction vessel 2 may be equipped with one or more traditional safety systems such as a safety relief valve 37, for example a model #26XA23 relief valve available from Teledyne Fluid Systems, Farris Engineering an Allegheny Teledyne Company, for venting to a flare via line 38 when pressure in the reaction vessel exceeds a desired operating pressure typically caused by fire exposure. In an embodiment of the present invention, this pressure could be set at a higher pressure than the pressure at which the emergency safety injection kill system 125 activates, e.g., higher than the pressure required to rupture the rupture disk 10 discussed below. In another embodiment of the present invention, this pressure could be set at a lower pressure than the pressure at which the emergency safety injection kill system 125 activates. Safety relief valve 37 may be coupled to reaction vessel 2 as known to those skilled in the art, for example via line 9.

In an embodiment of the present invention, each leg of a bulk loop reactor contains an injection port, similar to injection port 7 shown in FIG. 1, that is coupled to the emergency safety injection kill system 125, for example via jumper lines 13 and 14 extending from line 15 and coupling (as described herein in detail with reference to line 15) to an injection port. The injection ports for jumper lines 13 and 14 are not shown in FIG. 1. During an emergency such as a runaway reaction, the emergency safety kill injection system injects a reaction kill agent into multiple points around the base or other lower elevation points such that the kill agent may readily mix with the reactants to kill the reaction. For example, a gaseous kill agent may bubble up through the reaction vessel 2 to assist with mixing and killing the reaction. Also, pumps (not shown) in each leg of the reaction vessel 2 may help to speed the killing action. For example, even if power is lost, remaining wind milling of the pump may assist dispersion of the kill agent and speed the killing action.

A mechanical barrier isolates the reaction vessel 2 from the remainder of the emergency safety injection kill system 125, which, during normal reactor activity, prevents flow from entering into line 15 from the reaction vessel 2. An example of a suitable mechanical barrier is a non-reclosing pressure relief safety device such as a burst or rupture disk. Referring to FIG. 1, a rupture disk 10 is disposed within line 15, for example in close proximity to tee 8 or in another suitable location between tee 8 and modified pilot operated relief valve 20. In an embodiment of the present invention, to ensure that the emergency safety injection kill system does not accidentally activate due to a leak of pressure across the rupture disk, a dual rupture disk may be utilized and the pressure monitored between the two disks to check for such leaks. Suitable rupture disks conform to the safety requirements of ASME Sections VIII and III and are available from BS&B Safety Systems, Inc. located in Tulsa, Okla. In an embodiment of the present invention, the rupture disk is designed to rupture at a pressure of about 750 psig. Therefore, upon the event of a runaway reaction, once the internal pressure of the reaction vessel 2 reaches about equal to or greater than 750 psig, the rupture disk 10 will fail allowing line 15 to pressurize. During normal operation of the reaction vessel 2 with the closed rupture disk 10 in place, line 15 would be shut at both ends (i.e., via the closed rupture disk 10 and by the closed modified pilot operated relief valve 20) and remain at a very low pressure of about 0 psig. The pressure in line 15 may be monitored with the pressure indicator and transmitter 30 to check for leaks across the modified pilot operated relief valve 20 or closed rupture disk 10.

Figure 2:
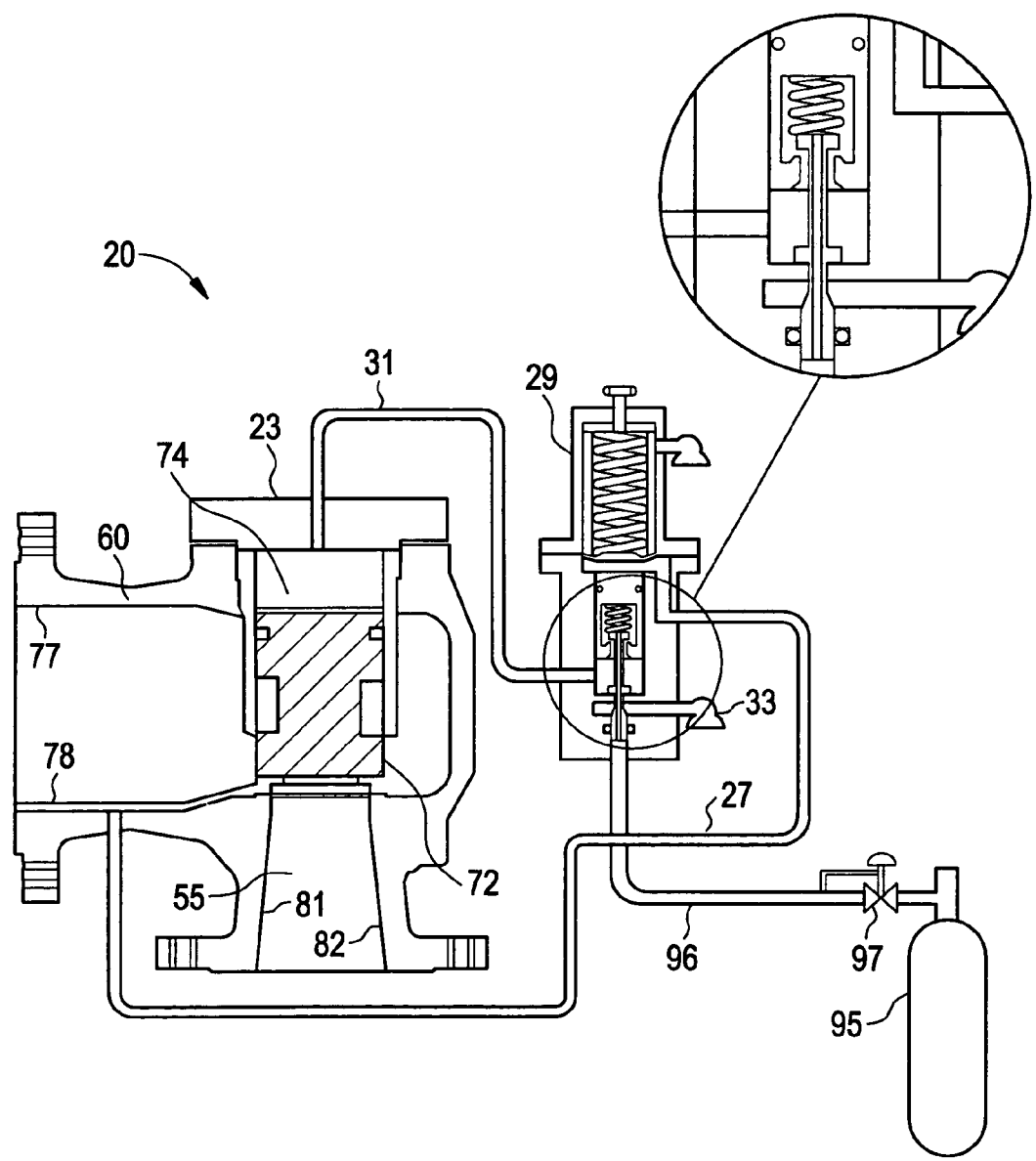
FIG. 2 is a process flow diagram of a modified pilot operated relief valve for use in the emergency safety injection kill system of the present invention.

Line 15 is coupled to the modified pilot operated relief valve 20 having a main valve body 23 controlled by a pilot valve 29. FIG. 2 is a more detailed diagram of the modified pilot operated relief valve 20, wherein an ASME approved pilot operated safety relief valve is modified and installed to inject a fluid, e.g., a catalyst kill agent, into the reaction vessel 2 rather than to relieve fluid flow out of the reaction vessel. Typically, in a normal pilot operated safety relief valve installation, the outlet line from the pressurized vessel, e.g., line 15, is connected to the contained side 55 (normal inlet side) of the pilot operated relief valve and the normal location of the pressure sensing line 27 is also in the contained side (normal inlet side) of the pilot operated relief valve. However as modified for use herein, line 15 and pressure sensing line 27 are coupled to the relief side 60 (normal outlet side) of pilot operated relief valve 20. Pressure sensing line 27 may connect directly to line 15 or may be connected to relief side 60 of the main valve body 23, as shown in FIG. 2, for example via known means such as threads, drill and tap, welding, and the like. The pilot valve 29 continuously senses the pressure in line 15, as shown in FIG. 1, via the pressure sensing line 27.

The pilot valve 29 is coupled to main valve body 23 via control line 31 for actuation, e.g., opening and closing, of the main valve body 23. The main valve body 23 has a piston 72 with a chamber 74 disposed over the valve member 72. When the pressure in line 15 increases to a set pressure as sensed by sensing line 27, the pilot valve 29 opens to vent the chamber 74 back through line 31 exiting through the outlet 33 of the pilot valve 29 and reduces the chamber pressure thereby providing for opening of the piston 72. The set pressure for the pilot valve 29 can be set to operate at any desired sensed pressure between about 0 psig and the set pressure of the rupture disk. Preferably the set pressure should be set high enough so as not to trip the system unnecessarily, for example due to a small leak into line 15 or other non-emergency event. The desired set pressure for the pilot valve 29 is about between 100 and 250 psig, (0.791 and 1.83 MPa) and the most desired set pressure for the pilot valve 29 is about 200 psig (1.48 MPa). Additionally, the modified pilot operated relief valve 20 installation desirably should include a back flow preventer so that the valve will not backflow if a reaction pressure becomes higher than the injection source pressure. In the embodiment shown in FIG. 2, pilot valve 29 is normally biased in a closed position by a pressurized gas source 95 such as nitrogen or air connected via line 96. In an alternative embodiment of the present invention, line 96 could connect pilot valve 29 to line 22 as shown in FIG. 1, such that gas from container 25 is used to bias pilot valve 29. While inner walls 77 and 78 of relief side 60 are shown necked down as they approach piston 72, walls 77 and 78 may have alternative alignments such as substantially parallel, flared, etc. Likewise, while inner walls 81 and 82 of contained side 55 are shown flared inward as they approach piston 72, walls 81 and 82 may have alternative alignments such as substantially parallel, flared outward, necked, etc.

An example of a pilot operated valve suitable for modification and installation as described herein is disclosed in U.S. Pat. No. 4,445,531, issued May 1, 1984 and entitled "Pilot for Safety Valve", hereby incorporated herein in its entirety. Another example of a pilot operated valve suitable for modification is the Iso-Dome Series 400 available from Anderson, Greenwood & Co. of Stafford, Tex. Sizing of the modified pilot operated safety relief valve should be made to accommodate transfer and injection of the amount of kill agent required to kill the reaction in reaction vessel 2. The amount of kill agent required is expected to be relatively small for typical reactors and therefore the smallest valve commercially available may be sufficient for this application.

The modified pilot operated relief valve 20 is coupled to a pressurized source of reaction kill agent. Referring to FIG. 1, a volume bottle 100 is connected via an outlet and line 22 to the contained side 55 (normal inlet side) of the modified pilot operated relief valve 20. An inlet of volume bottle 100 is connected to a pressurized source of kill agent 25 via line 26. The volume bottle 100 and the pilot operated relief valve 20 are desirably located in close proximity to reaction vessel 2 to minimize the pressure drop, thereby maximizing the speed and amount of injection of kill agent into the reactor (providing an instant 'shot' of kill agent). Desirably, the volume bottle 100 is sized to hold an amount of kill agent sufficient to be injected through all injection ports and quickly kill the reaction based upon the amount of reactants therein. Also desirably, the kill agent is under a pressure sufficient to be higher than the pressure of the reactor under runaway conditions.

Any suitable reaction killing agent having a desirable quick killing action may be used, and desirably is a fluid such as a liquid or gas. In an embodiment of the present invention the reaction is a free radical polymerization and the killing agent is any known to be useful to those of ordinary skill in the art, such as water or ethylbenzene. In another embodiment of the present invention, the reaction killing agent may be a catalyst killing agent that quickly kills a needed catalyst, thereby halting the reaction. Examples of kill agents useful with the present invention include alcohols, e.g., methanol, isopropanol; water; water and alcohol; carbon monoxide, pure or mixed with diluent gases such as nitrogen; a N,N-Bis(2-hydroxyethyl) alkylamine, such as ATMER 163 available from ICI Americas Inc.; a polymeric nitrogen and sulfur compound known as STADIS 425 available from Dupont; and the like. Mixtures of these materials can also be used. Any compound or material that is known to those of ordinary skill in the art of killing a reaction to be useful can be used with the present invention. In one embodiment of the present invention, the reaction is a poly alpha-olefin polymerization, specifically propylene polymerization, and the killing agent is carbon monoxide, for example dilute carbon monoxide in nitrogen, more specifically about 3 weight percent carbon monoxide in nitrogen. The carbon monoxide may be supplied, for example, via a pressurized bottle 25, and is desirably supplied at a pressure substantially higher, e.g., from about 1500 to 2000 psig (10.4 to 13.9 MPa) than the rupture pressure of the rupture disc, e.g., about 750 psi (5.27 MPa). The carbon monoxide can be supplied directly from a pressurized container of kill agent 25 or more desirably from an intermediate source such as volume bottle 100 as shown in FIG. 1.

Pressures may be monitored at various points in lines 22 and 26, for example with pressure indicator/transmitter 24 and/or a local gauge 28. For example, line 22 connecting the volume bottle 100 and the safety valve 23 may be monitored for pressure changes to ensure a sufficient supply of carbon monoxide is available to kill a catalyzed reaction in the event of an over pressurized reactor due to a runaway reaction. When the pressure transmitter 24 in line 22 indicates that the pressure has dropped below a desired minimum pressure, for example about 1500 psig (10.4 MPa), the carbon monoxide bottle 25 is desirably replaced.

In an emergency such as a runaway reaction, the pressure in reaction vessel 2 increases until the rupture disk 10 fails allowing line 15 to pressurize. The modified pilot operated relief valve 20 senses the increased pressure in line 15, and if greater than the set pressure, opens the main valve body 23, as described previously. Upon opening, pressurized kill agent from volume bottle 100 passes through the opened modified pilot operated relief valve 20 via line 22, reversing the direction of flow in line 15 (the line connecting the reaction vessel 2 to the modified pilot operated relief valve 20), through the burst rupture disk 10, through the flush line 5, through the injection nozzle 7, and thus injecting the killing agent into the reaction vessel 2 to kill the reaction therein.

In an embodiment of the present invention, the mechanically operated emergency safety injection kill system 125 is a stand-alone safety system. In alternate embodiments, the mechanically operated emergency safety injection kill system 125 may be used as a redundant and/or backup system working in conjunction with traditional safety systems and/or other kills systems. Examples of traditional safety systems include relief valves, such as valve 37 in FIG. 1, and/or burst disks. Example of other kill systems include engineered control kill systems, such as second kill system 4 in FIG. 1, that are electronically controlled and rely on availability of energy sources. Various embodiments may include the staging of two or more safety systems such that the systems activate at progressively increasing pressures. In an embodiment of the present invention, a polypropylene bulk loop reactor comprises three systems staged to activate progressively: a first system comprising an engineered control system designed to activate at a relatively low pressure compared to the other systems; a second system comprising the mechanically operated emergency safety injection kill system described herein designed to activate at a relatively medium pressure compared to the other systems; and a third system comprising a traditional safety system such as a relief valve and/or rupture disk designed to activate at a relatively high pressure compared to the other systems and typically used to relieve a vessel being exposed to an external fire. In alternative embodiments, a polypropylene bulk loop reactor may be equipped with the first and second systems (set to activate near simultaneously or staged, and if staged in order of first then second or alternatively second then first), or alternatively the second and third systems (set to activate near simultaneously or staged, and if staged in order of second then third or alternatively third then second).

While the embodiments of the invention have been shown and described, modifications thereof can be made by one skilled in the art without departing from the teachings of the invention. Safety relief design criteria, pendant reaction kill system processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A safety system for terminating a runaway reaction within a reaction vessel, comprising:
   a pressurized supply of a kill agent;
   a flow path between the pressurized kill agent supply and reaction vessel for conveying the kill agent to the reaction vessel; and
   a pressure activated mechanical barrier with a pressure setting that block the flow path; and
   wherein the mechanical barrier is opened if pressure in a flow line between the barrier and the reaction vessel exceeds the set pressure Of the mechanical barrier, thereby transferring the kill agent to the reaction vessel and thereby stopping the runaway reaction, wherein the mechanical barrier comprises a pilot operated valve.

2. The safety system of claim 1 wherein the pilot on the pilot operated valve opens when the valve when the pressure setting of the valve in the flow line to the reaction vessel is exceeded.

3. A safety system for terminating a runaway reaction within a reaction vessel, comprising:
   a pressurized supply of a kill agent;
   a flow path between the pressurized kill agent supply and reaction vessel for conveying the kill agent to the reaction vessel; and
   a pressure activated mechanical barrier with a pressure setting that block the flow path; and
   wherein the mechanical barrier is opened if pressure in a flow line between the barrier and the reaction vessel exceeds the set pressure Of the mechanical barrier, thereby transferring the kill agent to the reaction vessel and thereby stopping the runaway reaction, wherein the barrier comprises a rupture disk located in the flow line between the reaction vessel and the pilot operated valve.

4. The safety system of claim 3 wherein the pressurized supply of kill agent is pressurized carbon monoxide.

5. A safety injection kill system, comprising:
   a pressurized supply of a kill agent;
   a main valve body having first side for connecting to a reaction vessel and a second side for connecting to the pressurized kill agent;
   a pilot coupled to the main valve body for opening and closing the valve to fluid flow;
   a flow line coupled between the pilot and reaction vessel, wherein an increase in pressure on the first side of the valve body beyond a set pressure will cause the pilot to open the main valve body in response thereto such that the kill agent may flow through the valve to the reaction vessel.

6. The safety system of claim 5 wherein the kill agent is injected into the reaction vessel via the opened flow line, thereby terminating the reaction and decreasing pressure in the reaction vessel.

7. The safety system of claim 5 where a plurality of kill agents are used.

8. A safety system for terminating a runaway reaction within a reaction vessel, comprising:
   a pressurized supply of a kill agent;
   a flow path between the pressurized kill agent supply and reaction vessel for conveying the kill agent to the reaction vessel; and
   a pressure activated mechanical barrier with a pressure setting that block the flow path; and
   wherein the mechanical barrier is opened if pressure in a flow line between the barrier and the reaction vessel exceeds the set pressure Of the mechanical barrier, thereby transferring the kill agent to the reaction vessel and thereby stopping the runaway reaction, wherein the mechanical barrier comprises a non-reclosing pressure relief device.

9. A safety system for terminating a runaway reaction within a reaction vessel, comprising:
   a pressurized supply of a kill agent;
   a flow path between the pressurized kill agent supply and reaction vessel for conveying the kill agent to the reaction vessel; and
   a pressure activated mechanical barrier with a pressure setting that block the flow path; and
   wherein the mechanical barrier is opened if pressure in a flow line between the barrier and the reaction vessel exceeds the set pressure Of the mechanical barrier, thereby transferring the kill agent to the reaction vessel and thereby stopping the runaway reaction, comprising a first system that is a stand-alone system that operates without any electrical or computer control and a second system in parallel with said first system that operates with an electronically controlled system.

10. The safety system of claim 1 wherein the pilot senses the increase in pressure via a pressure sensing line in communication with the flow path between the reaction vessel and the pilot operated valve.

11. The safety system of claim 8 wherein the non-reclosing pressure relief device comprises two or more rupture disks.

12. The safety system of claim 5 wherein the barrier further comprises a rupture disk located in the flow line between the reaction vessel and the pilot operated valve.

* * * * *